United States Patent [19]
Weinheimer

[11] 3,821,877
[45] July 2, 1974

[54] PROCESS FOR PICKING UP DOWNED CROPS AND APPARATUSES THEREFOR

[76] Inventor: James A. Weinheimer, P.O. Box 1365, Pandhandle, Tex. 79068

[22] Filed: Dec. 11, 1972

[21] Appl. No.: 314,173

[52] U.S. Cl. .................................. 56/312, 56/318
[51] Int. Cl. ........................................ A01d 65/02
[58] Field of Search ............ 56/312, 314, 319, 320, 56/318, 14.4, 14.5, 14.6, 119

[56] References Cited
UNITED STATES PATENTS

| | | | |
|---|---|---|---|
| 2,298,121 | 10/1942 | Grimes | 56/312 |
| 2,552,623 | 5/1951 | Dye | 56/312 |
| 2,577,324 | 12/1951 | Goesch | 56/312 |
| 2,746,231 | 5/1956 | Ayers | 56/318 |

*Primary Examiner*—Antonio F. Guida
*Attorney, Agent, or Firm*—Ely Silverman

[57] ABSTRACT

Array of narrow downwardly and forwardly extending rigid probe members and upwardly and rearwardly sloped vibratory lifter and guide members are supported on a combine header to utilize the weight and forward and vibratory motion of the combine apparatus and its reel to raise downed crop stalks with substantially no interference with the cutting and conveying and separating operation of the combine.

9 Claims, 22 Drawing Figures

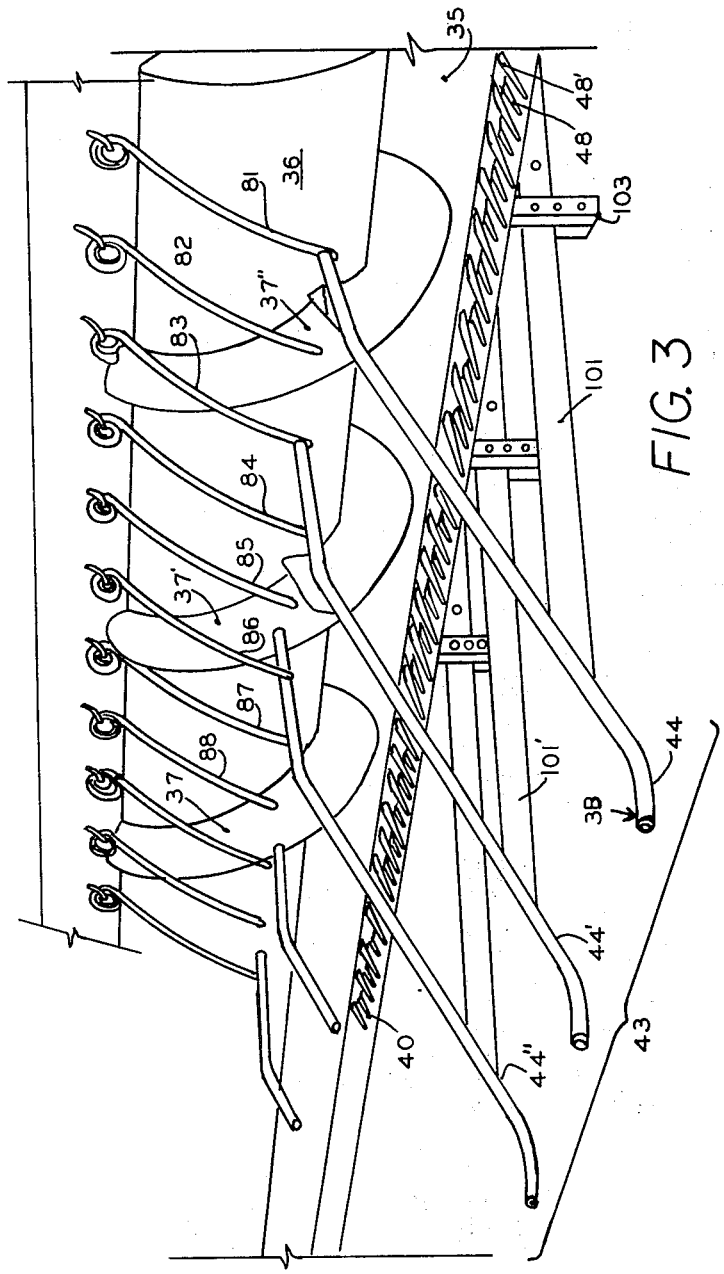
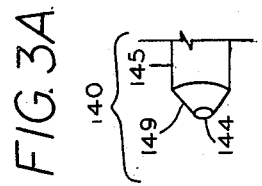
FIG. 3
FIG. 3A

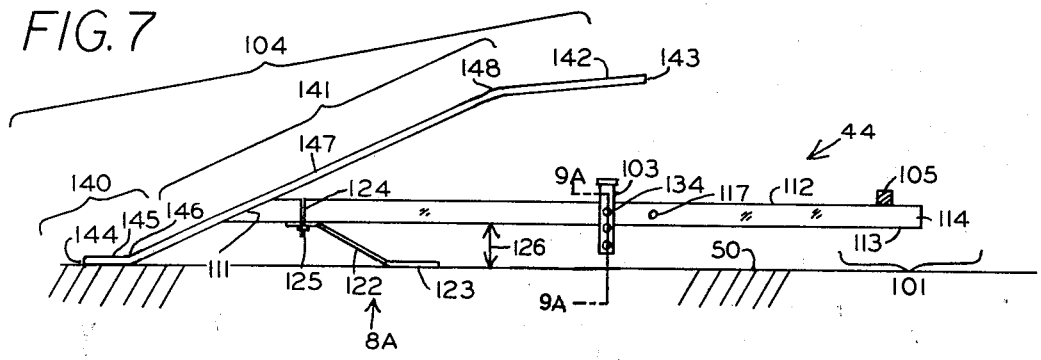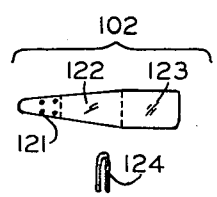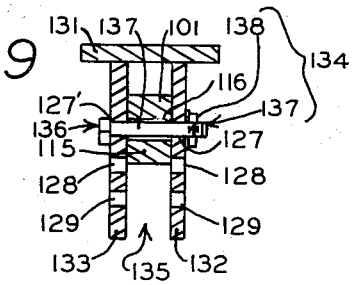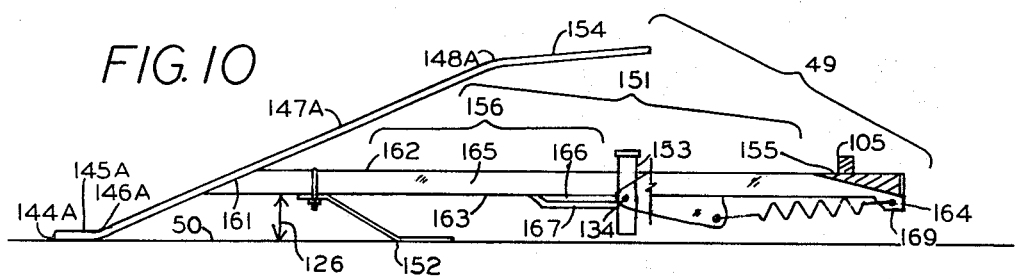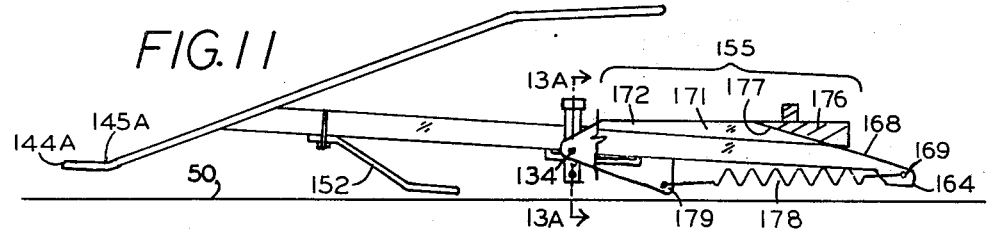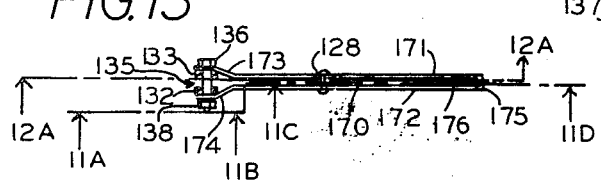

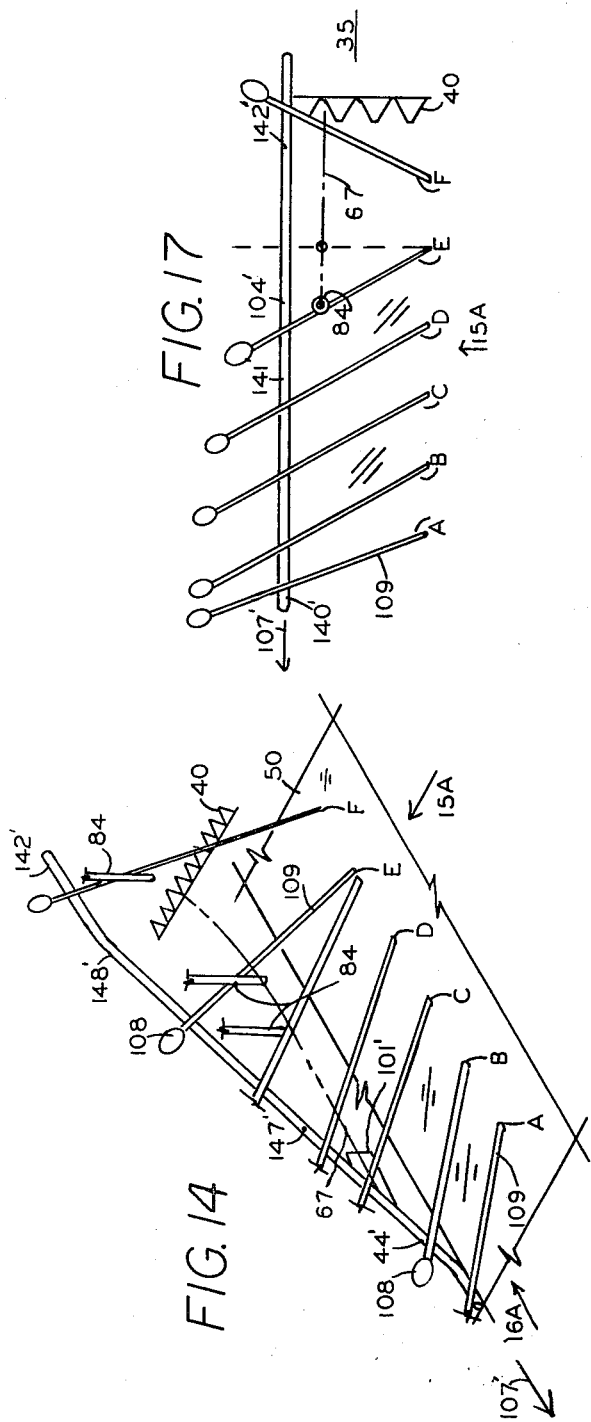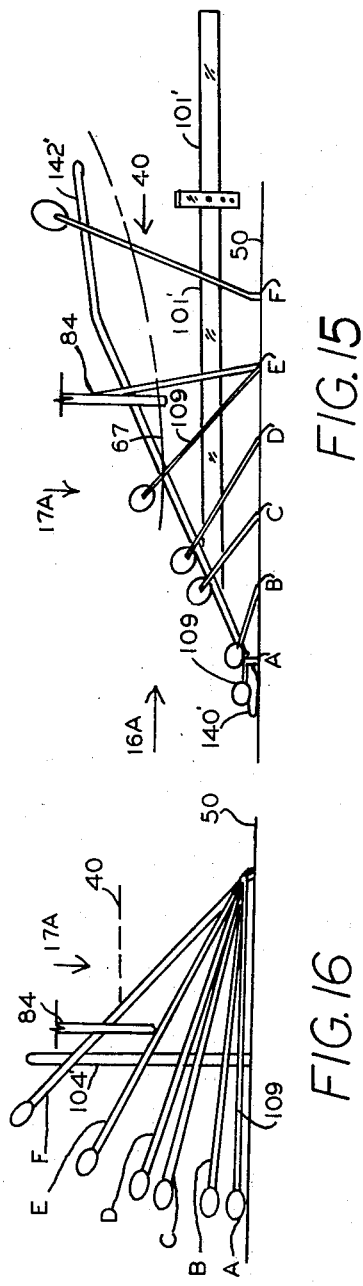

PROCESS FOR PICKING UP DOWNED CROPS AND APPARATUSES THEREFOR

BACKGROUND OF THE INVENTION

1. Field of This Invention Harvesting and harvesting catchers; above ground means for detaching plant parts, with conveyors to the cutter; deflectors for surface material; plows or blades contiguous to vibrating separators; leading plow or cutter with contiguous fixed inclined separator; moving conveyors, diggers and separators.

2. Description of the Prior Art

Conventional combines cannot be located with their sickle bars lower than 3 inches from the ground and even such height is not effective to pick up grain which, when downed by heavy weather (hail, rain, wind and the like) lies at ground level, i.e., less than 2 inches above the ground and usually less than 1 inch, i.e., on the ground.

Crops downed by heavy weather have been regarded as a total loss.

This apparatus utilizes the vibration of the combine due to vibrations from oscillating cutter teeth of the sickle bar unit, surges of grain in the auger and vibration of cleaning and separating units as well as irregularities in the ground over which the combine apparatus passes on cleated tires to effectively engage and raise downed grain without interfering with the cutting and separating action of conventional combines.

With the use of the apparatus (snorkel probe and guide assemblies) of this invention, such heavily weather-downed fields have yielded up to 6,000 pounds of grain sorghum per acre. The apparatus, used with bat or finger reels, efficiently works on row crops and/or broadcast crops. There are no separate mechanical parts to break down, no machine strain or power drain to slow down field operations and these snorkel probe and guide assemblies are easy to install on many usual makes of combine.

BRIEF DESCRIPTION OF THE DRAWINGS

FIG. 3 is a top oblique view from the right side of the header assembly 34 to illustrate relations of the parts of the array of probe and guide assemblies to the cutter bar and auger as well as to the reel teeth of apparatus 30.

FIG. 3A is an enlarged view of zone 3B of FIG. 3.

FIG. 4 diagramatically shows in plan view relationship of the snorkel probe and guide assemblies 44, 44' and 44" to parts of the header 34 of the apparatus 30 of FIG. 1.

FIG. 7 is a side view of the assembly of FIG. 5 along direction of arrow 7A of FIG. 5.

FIG. 8 is a bottom view of the shoe 102 shown along the direction of arrow 8A of FIG. 7.

FIG. 9 is a transverse view of bracket 103 along the direction of vertical section 9A—9A of FIG. 7.

FIG. 10 is a side view of another embodiment of apparatus according to this invention.

FIG. 11 shows the components of apparatus of FIG. 10 with the guide member thereof tilted upwardly and moved backwardly; FIG. 11 is partly in section along broken section 11A, 11B, 11C, 11D of FIG. 13.

FIGS. 7 through 12 are drawn to scale. FIGS. 1, 2, 3 and 6 are drawn in perspective.

FIG. 12 is a sectional view along vertical section 12A—12A of FIG. 11.

FIG. 13 is a top view of the guide tensioning frame 155 of FIGS. 10, 11 and 12.

FIG. 14 is a diagrammatic isometric showing of the positions of each of a series of broken sorghum stalks arrayed in a straight line parallel to the path of a neighboring reel tooth and guide member 44'.

FIG. 15 is a side view of the array guide member 44, reel tooth path and of broken stalks of FIG. 14, as seen along direction of arrow 15A of FIGS. 14 and 17.

FIG. 16 is a front view of the guide member 44, reel tooth and array of broken stalks shown in FIG. 14 as seen along the direction of arrow 16A of FIGS. 14 and 15.

FIG. 17 is a plan view of the guide member 44, part of reel tooth and array of broken stalks of FIG. 14 as seen along the direction of arrow 17A of FIGS. 15 and 16.

Figure 1:
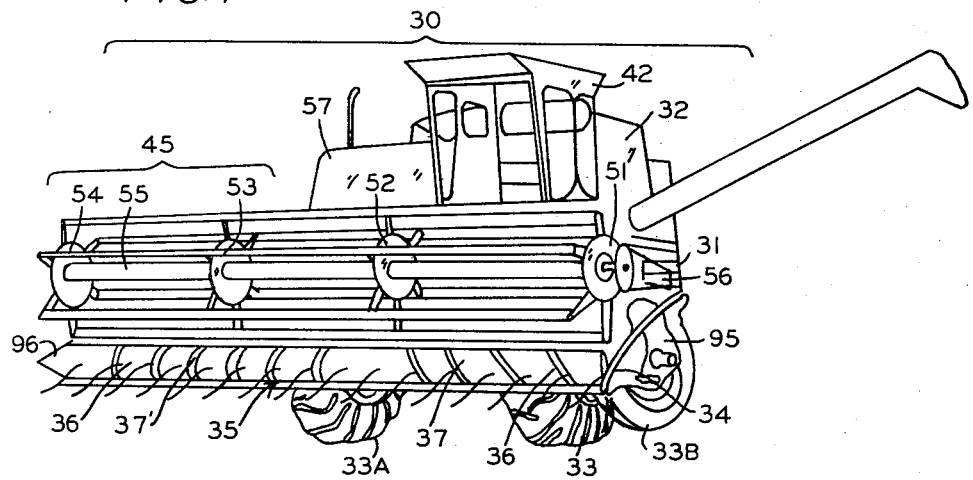
FIG. 1 is a perspective view of an assembly 30 showing the overall arrangement and combination of apparatus 30 in which the snorkel probe and guide assembly of this invention is operative.

DESCRIPTION OF THE PREFERRED EMBODIMENTS:

The harvester assembly 30 includes a frame 31 on which is supported a threshing cylinder and a separator and a housing 32 thereover a power source 57 and an operator's seat in a cab 42. The frame 31 is supported on wheels 33, 33A, 33B. Ahead of the front wheels 33 and 33A, the harvester includes a transversely extending header, generally shown as 34. The header is wide and includes an elongated transversely extending auger trough 35, having an auger 36 journaled therein. The auger 36 has helical feed flights 37 and 37' thereon. The flights deliver toward the center portion of the auger trough. These flights have their adjacent ends spaced apart at the center portion 38. In the center portion, the feeder to the header spout 39 is located.

The auger trough 35 is supported on the outer end of a header spout 39. The auger 36 delivers from its center portion directly into the lower end of the header spout.

The location of the header is controlled by conventional hydraulic pistons, as 41, operatively connected to the frame 31 and under the control of the operator of assembly 30 in cab 42 which pistons raise and lower the header relative to the frame of the assembly 30 in conventional manner.

The auger trough 35 is provided, along its forward edge, with a sickle bar unit 40 and an array 43 of like snorkel probe and guide assemblies 44, 44', 44'' and 44'''. A comb reel 45 cooperates with the auger trough 35 and a sickle bar unit 40. The reel is carried on the outer end of rigid reel supporting arms, as 46. The reel supporting arms are pivoted on frame 31 for vertical swinging adjustment relative to the trough 35. The auger 36, the sickle bar unit 40 and the reel 45 are driven in conventional manner, as in U.S. Pat. No. 2,656,668.

Generally, the cylindrical reel 45 is mounted with its axis of rotation arranged parallel to and above the line of cutter knives, as 48, of the sicle bar unit 40: the reel teeth, as 81–88, push grain cut from their source in the land 50 back into auger-conveyor 36 on which conveyor the cut grain is moved centrally between the counter-rotating guides 37 and 37' to the spout 39; a conveyor in the spout 39 passes the grain to the threshing and separator units within the housing 32. The reel unit 45 comprises a pair of reel supports as 47, spider arms as 51–54, and combs 61–66. The reel supports, as 47, are adjustably located on reel support arms as 46. The spider arms are firmly attached to a reel shaft 55 that is rotatably supported at its lateral ends in reel supports as 47. The reel shaft 55 supports the spider arms and is rotatably driven by transmission means, as 56, operatively connecting such shaft to power means, as 57, of assembly 30.

Figure 21:
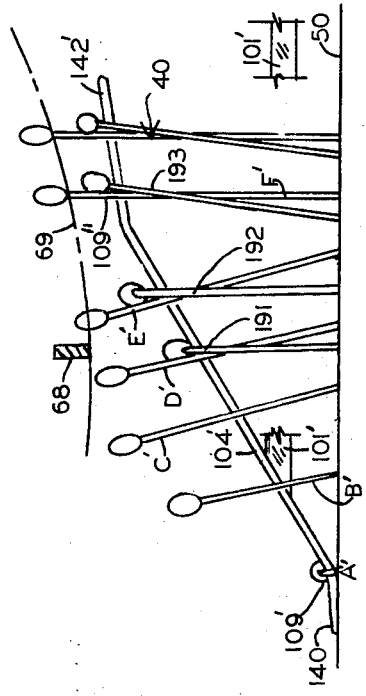
FIG. 21 is a plan view of the guide member 44, part of reel slat and array of broken stalks of FIG. 18 as seen along the direction of arrow 21A of FIGS. 19 and 20.

Each of the lateral spider arms, as 51 and 54, comprise a pair of like inner and outer axially symmetrical spiders, as 58 and 59, for lateral spider arm 51. The centers of all such spiders as 58 and 59 are spaced apart the same amount and the ends thereof are connected by links as 71–76; the links are firmly connected to the combs 61–66 respectively in conventional manner to provide for maintaining the reel teeth, as 81–88 of comb 63, vertical in the movement from their most forward position, shown for comb 61 in FIG. 21, to their movement toward and over the sickle bar (position of comb 64 in FIG. 2).

The header 34 has a rigid frame including front and rear longitudinal members 91 and 92 and cross members as 93 and 94 rigidly joined together with the longitudinal members firmly attached to the rigid end walls 95 and 96 of the auger trough 35. The front longitudinal member is a rigid steel ell and is firmly attached to and supports the sickle bar unit 40 and is located immediately to the rear thereof and supports an array 43. The array 43 of snorkel and guide assemblies comprises a plurality of like units, as 44, 44' and 44'', each like snorkel and guide assembly 44 and is a part of overall assembly 30.

Figure 2:
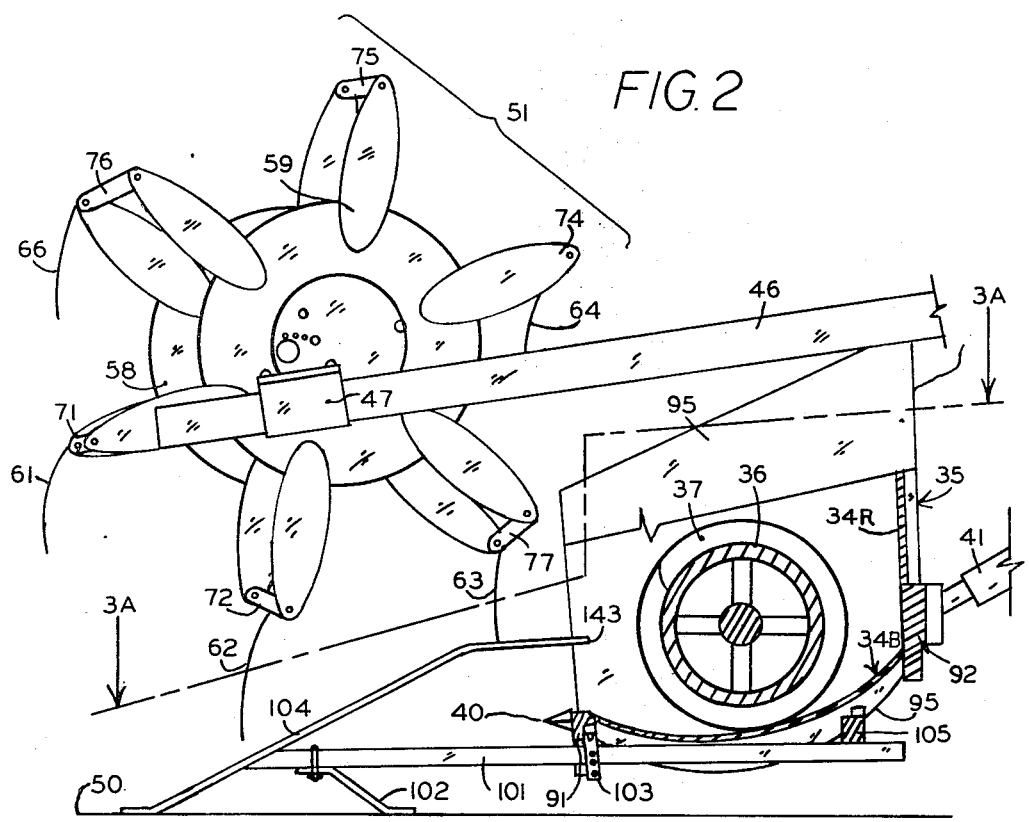
FIG. 2 is a side view of apparatus 30 along the direction of arrow 2-A of FIG. 1 with the end wall 95 of the auger trough 35 partly broken away.
Figure 4:
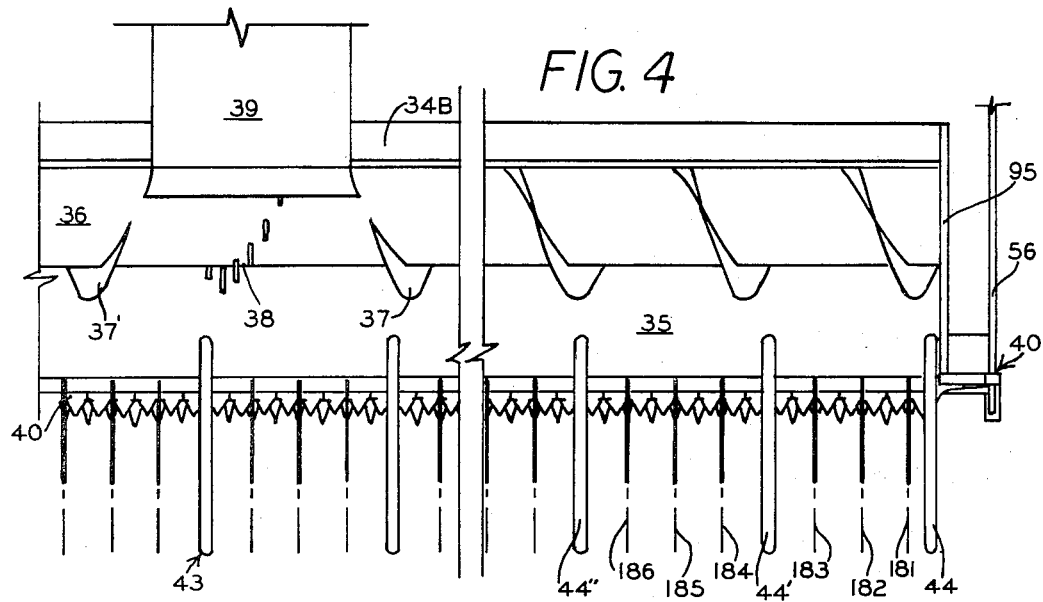
FIG. 4 is a top or plane view of the header 34 along the broken section 3A—3A of FIG. 2 with the reel 45 and its combs removed for purposes of clarity.
Figure 5:
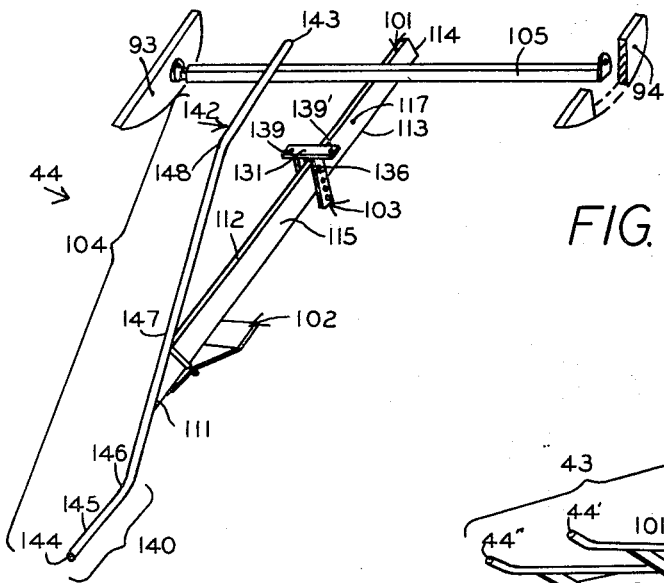
FIG. 5 is a top oblique view of one snorkel probe and guide assembly 44 of this invention and is diagrammatic.

The snorkel probe and guide assembly 44 comprises a longitudinal support member 101, a spacer shoe 102, a bracket support 103 and a curved guide member 104 operatively connected, as shown in FIGS. 2, 5, and 7 and herebelow described with reference thereto and extending in direction of motion 107 of combine 30.

The longitudinal support member 101 is a straight rigid yet resilient bar of uniform rectangular transverse cross section and having a greater height than width: it has a front end edge 111, a top edge 112, a bottom edge 113, a rear end 114 and a body portion 115, with a uniform transverse cross section. The front end edge is straight and tapered downwardly and forwardly.

Bar body portion 115 is pierced near to the middle thereof by horizontally extending support bracket pin holes 116 and 117 which holes also extend transversely to the length of the bar 101 to receive a pin attached to the bracket support 103.

A spacer shoe 102, shown in FIGS. 5, 7 and 8, is attached to the bar 101, as shown in FIGS. 5 and 7. The spacer shoe is comprised of a rigid metal plate of wearable steel and comprises, in operative combination, a front portion 121, an intermediate sloped portion 122 and a rear support portion 123 integrally serially joined together: the front portion is a rectangular flat rigid plate firmly held by a U-shaped bolt 124 and lock nuts as 125 adjacent to the bottom of the forward portion of bar 101 between the front end 111 of the bar and the support bracket hole 116. The intermediate sloped portion is a rigid trapezoidal plate, which in the operative position of the guide assembly 44, as in FIGS. 2, 3, 4 and 14, sloped rearwardly and downwardly and is fixedly attached to and continuous with the front edge of the rear support plate, which is a wide and long smooth bottomed horizontal plate to provide a slidable vertical locator and/or support for the point 144 of the guide assembly 44.

Each such shoe, as 102, and especially the sloped intermediate portion 122 thereof helps with the support provide by bracket as 103 to maintain a vertical space as 126 between the lower edge as 113 of bar as 101 and the ground 50 over which each of assemblies as 44 of array 43 is carried by the assembly 30.

The snorkel bracket support 103 comprises a top plate 131, a left side bracket plate 132, a right side bracket 133 and a pin 134 joined as shown in FIG. 9 in shape of Greek letter $\pi$ (Pi). The left side bracket plate 132 and right side bracket plate 133 are mirror images of each other as to size and shape. The top bracket plate 131 is a rigid steel flat rectangular plate; the left and right bracket plates are rigid flat steel rectangular plates of equal size and shape. The plates 132 and 133 are firmly joined, as by welding, at their top to the bottom of top bracket plate 131 and are separated from each other by a rectangular space 135. A series of vertically extending bracket pin support holes 127, 128 and 129 are located in left vertical bracket plate 132 and a series of like vertically extending bracket holes 127', 128' and 129' is located in right vertical bracket plate 133.

A bracket support pin 134 is comprised of a bolt 136 with a head and a shaft 137 and a lock nut 138. The shaft 137 passes through holes therefor, as 127 and 127' (in the bracket plates 132 and 133) and through the support bracket pin hole 116 in the longitudinal support member 101.

The bracket plates 132 and 133 form a tight press fit on the sides of the support bar adjacent to the support bracket pin hole.

The left and right bracket plates 132 and 133 with bolt 136, shaft 137, and nut 138 tightened form a sufficiently tight fit on the sides of bar 101 that there is no shaking in the sense of movement because of looseness of bar 101 about the pin shaft 137.

The curved guide member 104 is a single sturdy steel rod which has, as seen in side view as shown in FIG. 7, an ogee shape and a uniform transverse circular cross section. The guide rod 104 has a front lower nose or probe portion 140, an intermediate upwardly and rearwardly sloped portion 141 and a rear upper horizontally extending discharge portion 142 and a rear end 143. The portions 140, 141 and 142 are formed of one integral piece of steel rod. The nose or probe portion has a front probing edge or point 144 and a rearwardly and horizontally extending nose or initial guide rod sub-portion 145 immediately therebehind. The intermediate sloped portion 141 has at its front a forward curved portion 146 which is concave upwardly, continuous with and followed by a straight upwardly and rearwardly sloped straight central sloped portion 147 which is continuous with and followed by a rear curved portion 148 which is concave downwardly. The rear curved portion 148 of the intermediate portion 141 is continuous with the front end of the discharge portion 142. The rear upper discharge portion 142 is straight and extends horizontally with a very slight upward tilt in the operative position, as shown in FIGS. 2 and 7, and terminates on a rear guide rod end 143.

The entire front end edge 111 of the longitudinal support member 101 is firmly joined as by welding, to the rear edge of the curved guide member 104 at the top of the bottom third of its straight central sloped portion 147. The bottom edge 113 of the longitudinal support member 101 is, as shown in FIGS. 2, 5 and 7, accordingly at a vertical level higher than the bottom and top of the nose or probe portion 145 of the curved guide member 104.

The longitudinal support member 101 and the curved guide member 104, along the entire length of both, extend in the same flat vertical plane, the central longitudinal axis of the circular rod 104 extending in a vertical flat plane 106 co-planar with the central plane of symmetry of the rectangular bar 115.

The longitudinal support member 101 is a steel bar of greater height than width, sufficiently rigid, by reason of its height, to be substantially undeflected vertically in its normal operation: the width is sufficiently great to allow only a limited amount of resilient bending; force of 20 pounds applied to the front end thereof in the preferred embodiment produces a 1/32 inch deflection from a straight vertical line extending from rear end 143 thereof through the bracket pin in the center of bracket pin hole 116.

Figure 6:
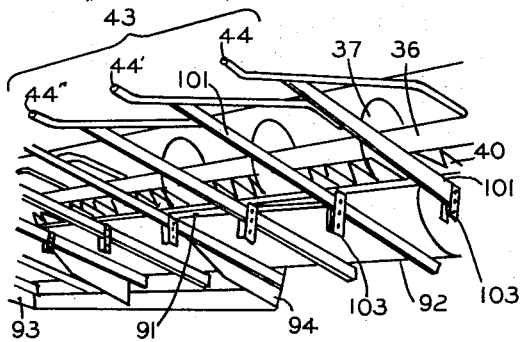
FIG. 6 is a front and upward directed view along direction of arrow 6A of FIGS. 2 and 4 illustrating the relations of the parts of the snorkel probe and guide array 43 to the bottom of the header 34.

The top plate 131 of the bracket support 103 is firmly, at its sides, as at bolt holes 139 and 139', attached to the rigid beam 91 from which the sickel bars 40 of the assembly as shown in FIGS. 2 and 6 are firmly attached. Otherwise, the plate 131 of bracket 103 is otherwise firmly attached to the header below and behind the sickle or cutter bar assembly: such attachment securely fixes the portion of the longitudinal support bar attached to the bracket support 103 below the trough 35 of the header, while the rear upper horizontally extending discharge portion 142 of the guide member is located above sickle bar unit 40 and each rear guide rod ends, as 143, is located above and to the rear of the cutter knives but forward of the outline of the path of the helical guides 37 on the auger 36.

The snorkel probe and guide assemblies 44, 44' and 44'' are located along the width of the header assembly 34 by firm attachment of the bracket supports of each such assembly, as 103, to the frame members or beams thereof, as beam 91. The rear end of the longitudinal support bar, as 101, rests against the bottom of the trough 35 where such trough is a rigid structure or a tail support bar 105 may be added to the frame of the header at the bottom and outside of the header, as by attachment to frame cross members as 93 and 94, as shown in FIG. 6. Accordingly, the rear end of the longitudinal support bar is firmly supported against upward motion and firmly prevents the front nose or probe portion 144 of guide rod 44 from moving to any lower position than provided for by the operator's movement of the header 34.

Accordingly, by control of movement and height of the header, over the ground 50, which control is conventional on combines as 30, the operator locates the position of the nose or probe portions 140 of each guide assembly as 44 of the group 43 relative to the ground 50 over which the assembly 30 travels.

The long and rigid attachment of the front end of the longitudinal support member 101 to the guide rod 104 prevents oscillations from the rear end 143 of the guide rod from creating vertical vibrations of the front end 144 of the guide rod 104. However, the front end of the longitudinal support member 101 does oscillate in a horizontal plane about a vertical axis passing through the attachment of the bracket 103 (at pin 134 in hole 116) to the support bar 101. The probe portion 141 of the guide rod 104 is sufficiently rigid and firmly attached to the front edge 111 of the guide support bar 101 that the nose or front edge of the probe moves in a path composed of the sum of a. the longitudinal motion of the assembly 30 to which the assembly 44 is attached, and
b. the horizontal oscillation of the probe 144 about the vertical line passing through the center of shaft 137 of pin 134 attaching the bracket support 103 to the bar 115.

Another embodiment of snorkel probe and guide assembly 49 which automatically yields rearwardly and tilts its nose upwardly, is shown in FIGS. 10–13: assembly 49 comprises a. a yieldable longitudinal support assembly member 151, which embodies some improvements and structures additional to the structure of longitudinal support member 101;
b. a spacer shoe 152 identical to shoe 102;
c. a bracket support 153 identical to support 103; and
d. a curved guide member 154, operatively connected, as shown in FIGS. 10–13 and hereinbelow described with reference thereto.

The longitudinal support assembly member 151 comprises a straight resilient rigid steel bar 156 of same size of uniform transverse cross section as bar 101 and a guide tensioning frame 155. Bar 156 has a. a sloped forwardly and downwardly sloped front end edge 161;
b. a top edge, one portion of which, 162, is straight from edge 111 to the rear of bracket 153 as far as the front edge of wedge 176. The rear portion of the top edge, 168, is sloped downwardly and rearwardly and is straight; and c. a bottom edge 163 to which are appended (i) at about its middle, a slot guard 167, and (ii) at its rear end, a spring hook retainer 169; and (iii) a rear end 164.

A pin 179 is located below edge 163 of bar 156 and extends between plates 171 and 172 and is firmly attached thereto.

A helical elastically resilient steel spring 178 extends from pin 179 to spring retainer hook 169.

A wedge 176 is located at top rear edge of panels 171 and 172: it has a smooth hard wedge surface 177 that extends downwardly and rearwardly at an angle of about 20°. This surface 177 matches the upper rear surface of bar 156.

The guide tensioning frame 155 comprises a rigid longitudinally and vertically extending left panel 171, a rigid longitudinally and vertically extending right panel 172, a wedge 176, and a spring 178. Panels 171 and 172 are rigid steel panels spaced apart from and parallel to each other by space 170 and joined at their rear by a rear end plate 175. The front end of panel 171 has a horizontally leftward displaced portion 173; the front end of panel 172 has a horizontally rightward displaced portion 174: portions 173 and 174 are supported on left and right sides of bracket 153 and are sufficiently displaced that the interior of panels 171 and 172 form a loose sliding fit with the rear portion of bar 156. Shaft 137, held in holes of bracket 153, passes through the longitudinally elongated slot 166 and permits longitudinal movement of bar 156 relative to that shaft when the force of spring 178 is overcome. As the bar 156 moves rearwardly with respect to bracket 153 (which is firmly attached to a beam member as 91 in the same manner and position as bracket 103) the front end 144 of guide member 154 is raised and moved backward from the position thereof shown in FIG. 10 to the position thereof shown in FIG. 11. Slot guard 167 encompasses a slot 166. Point 144 is a truncated cone coaxial with the central longitudinal axis of the reel 115. The conical portion 149 has a axial length of about 3/16 inch where the guide 104 is formed of rod of 5/8 inch diameter. This front end has a diameter of 7/16 inch. The bevel point assists in the movement of the rod over the ground.

In operation of the preferred embodiment, 19 guide assemblies as 44, 44' and 44'' of the array 43 are equally spaced along a 20 foot long header 34 and the comb teeth reel support arms as 46 are adjusted to locate the reel unit 45 vertically and longitudinally with respect to the sickle bar unit 40 so that the comb teeth thereof will travel above the sickle bar unit to not interfere therewith but in sufficient proximity thereto to be effective (i.e., to pass about 2 or 3 inches thereabove) in cooperation with the snorkel guide assemblies of array 43, to help raise and align the broken stalks relative to the cutter bars of the sickle unit 40.

The stalks of downed grain as sorghum and wheat are usually, when knocked down by hail and heavy wind or rain and the like, bent with a very short — i.e., less than ½ inch — radius of curvature, or cracked, at a height of less than 1 inch from the ground, but still maintaining mechanical connection between the portion of the stalk that bears the head of grain and the short base portion of the stalk attached to the root of the plant. The broken (but not separated) stalk lies on the ground not able to be picked up by the header, as 34, without units as 44 and/or 49.

In the operation of the apparatus 30 according to this invention, the path of the lower points of teeth of the combs 61–66, such as teeth 81–88 of comb 63, are circles extending in vertical planes as 181–186 for teeth 81–86, respectively. These paths as 181–186, are each parallel to each other and parallel to the vertical plane as 106 passing through the central longitudinal axis of each of the curved guide member rods, as 104, and the longitudinal support bar, as 115, in each such guide assembly as 44 and 44'. These paths for each of 48 sets of comb teeth, as 181–186, are spaced regularly along the cutter bars and parallel to the length of the guides, as 44, 44' and 44'' of guide array 43, three such paths, as 181, 182, 183, between each adjacent pair of guide assemblies as 44 and 44'.

To prepare apparatus 30 for operation, the probe and guide assemblies, as 44 or 49, are firmly attached by their brackets, as 103 or 153, respectively, to the front longitudinally extending frame member as 91: the location of a pin 134 attaching brackets, as 103 or 153, to longitudinal support means as 101 or 151, respectively, is chosen to hold bar 101 at a horizontal position while trailing portion 142 of rod 104 (or 154) is above and slightly behind the rear of the sickle bar unit 40 while the front edge, as 144 of each assembly as 140, is between ½ inch above and ½ inch below the ground on which combine wheels (as 33, 33A and 33B) are located.

In operation, the thus prepared combine 30 moves forward in the forward direction 107; direction 107 is straight and lies parallel to plane 106 of array of parts of each guide assembly as 44, 44' and 44''. FIGS. 14–17 illustrate the path of motion 107' (path 107' is parallel to path 107) of one guide bar 44' relative to one downed sorghum stalk 109 in a sequence of time intervals starting at position of stalk and guide shown as A in FIGS. 14–17, as well as showing the position of each of a series of like downed or broken or lodged sorghum stalk the bases of which are arrayed in a straight line parallel to the path of a neighboring reel tooth, as 84, and a neighboring probe and guide assembly 44'. Guide assembly 44' is identical to probe and guide assembly 44 and the referent numerals applied to such guide assembly 44' bear the superscript ' (prime) to denote the corresponding part (having the same referent number but without superscript) on probe and guide assembly 44. As the probe and guide assembly 44' passes the downed grain stalk 109, the probe 140' (like 140) is usually less than ½ inch above the level of ground 50 and may be ½ inch therebelow. Height adjustment of bar 101' at bracket 103' and conical surface as 149' causes the probe 144', like probe portion 144, to pass under the downed grain stalks without digging more than ½ inch into the ground. The nose subportion, as 145' (and 145), smoothly engages the downed stalks, as 109, and movement of the guide assembly bar 115' along direction 107' forces the head end 108 of stalk 109 upward along portion 141'.

The movement of the assembly 30 in direction 107 is accompanied by vibration of the frame of header 34 in upward and downward direction due to irregularities in the ground 50 over which the combine 30 travels as well as due to usual irregularities in resistance met by the auger 36 and assemblies 32 in their continued usual operation. Additionally, the sickle bar unit 40 causes horizontal vibration of the header 34. These vibrations of the header 34 and its frame are transmitted to the longitudinal support bar as 101 and 101' of each probe and guide assembly of array 43 as 44 and 44', through the rigid and firm attachment of the bracket as 103 and 103' thereof between the longitudinal frame member as 91 of the header 34 and the longitudinal support members as 101 and 101' thereof, respectively.

Such vibrations are transferred to the straight portion 147 and 147', concave downward portion 148 and 148' and discharge portion as 142 and 142' of guide assemblies as 44 and 44' and like portions of the other guide assemblies of array 43. The effect of such vibratory motion of the curved guide, as 104" (and 104) on which the downed stalk portions as 109 rest is to permit such stalks portions to move easily along the length of the rod as 104' and, thereby, be lifted from the downed position shown for downed stalk portion 109 in FIGS. 14 and 16, in a substantially smooth and continual manner through stages as shown for downed stalks A, B, C, D, E and F. When the downed stalk portion has been raised to the position diagrammatically shown for stalk E, a comb tooth, as 84, traveling in a path as 67' (corresponding to path 67 shown in FIG. 2) engages such downed stalk portion and, as the downwardly extending reel tooth then moves backward at a sufficient speed, greater than the forward speed of the combine 30, it further lifts the raised theretofore downed grain stalk portion free end so that the cutters of the sickle bar unit 40 may efficiently cut the portion of such stalk below the bottom of the head on that and on like other raised stalk portions. FIG. 15 shows the relation of stalk and guide assembly as seen from the side to illustrate the raising of the head end of downed stalk portions as 109 from the downed position (*a*) to the point in the operation (E) whereat the comb tooth as 84 engages the thus raised stalk portion (shown also in FIGS. 17 and 16).

Figure 19:
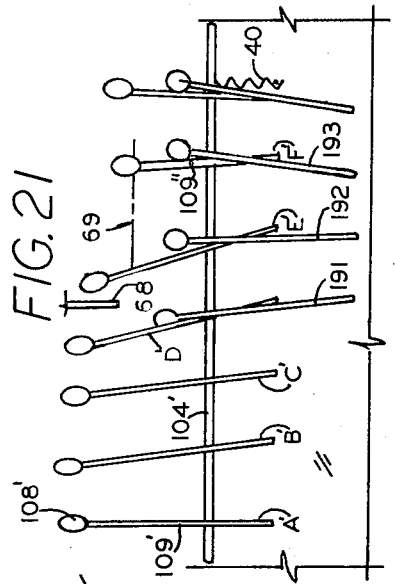
FIG. 19 is a side view of the array guide member 44, reel slat path and of broken stalks of FIG. 18 as seen along direction of arrow 19A of FIGS. 18 and 21.
Figure 18:
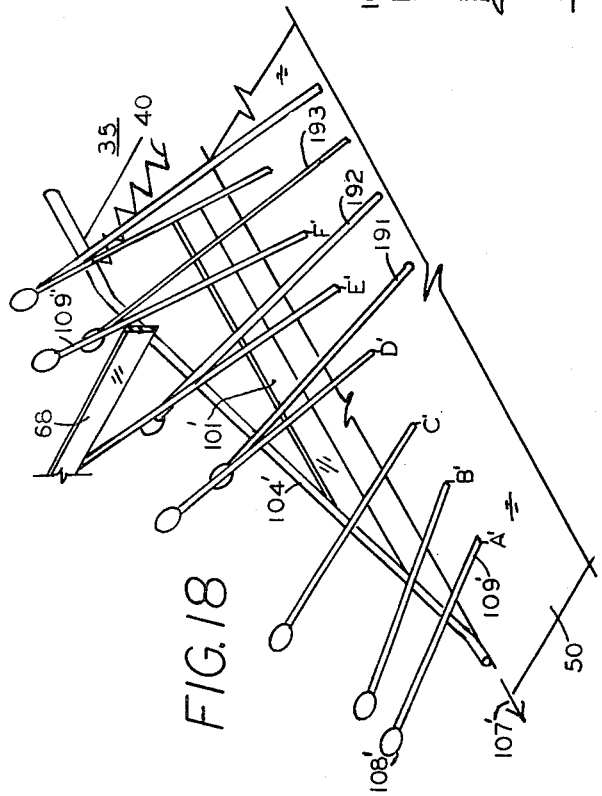
FIG. 18 is a diagrammatic isometric showing of the positions of each of a series of broken sorghum stalks arrayed in a straight line parallel to the path of a neighboring reel slat and guide member 44.
Figure 20:
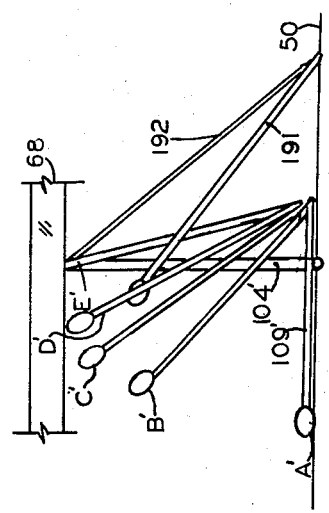
FIG. 20 is a front view of the guide member 44, reel slat and array of broken stalks shown in FIG. 18 as seen along the direction of arrow 20A of FIGS. 18 and 19.

Guides 44 and 49 are not limited to use with a reel comb but may be used with a bat reel, as shown in FIGS. 18–21. Where bats, as 68, are used, the vibrations of the guide members as 104 and 104' are the same as above described for FIGS. 14–17 and the movement of downed grain stalk portions as 109' (which stalk portions correspond to stalk portion 109) upwards as well as lenghtwise along the guide member 104' as shown in FIGS. 18–21. With the bat use however (as compared to the toothed comb reel 45), the bat must travel above the top portion, as 142' of the guide assemblies, as 104', as along path 69, as shown in FIGS. 18 and 19. The bat, accordingly, engages the portion of the raised, theretofore downed, stalks as 109', projecting beyond the guide assembly as 104' adjacent to the stalk of such downed stalk portion as shown in FIGS. 18 and 20. However, other theretofore downed stalks, as 191, 192, 193, with ends below bat path 69 are engaged by and raised on assembly 104' and engaged by the stalks as 109" at positions as F' (and which stalk had been engaged and moved by the bat 68) and moved upward along guide rod as 104' to be cut by the sickle bar unit 40 below the head thereof, as a mass of downed grain is usually in the form of a felted mass because grain seeds are planted about 3 to 4 inches apart. The above discussion of single stalks is provided as a simplified explanation of the action on the entire felted mass by illustration of action of the array 43 on a single downed stalk and on a linear series of downed stalks 109 and 109' in FIGS. 14–21 and on a pair of linear series of downed stalks (line A' – F' and line 191–193 in FIGS. 18–21).

The guides as 44 and 49 do an excellent job of picking up both fallen and leaning row crops and broadcast crops such as grain sorghum (above referred to as sorghum) although above described in operation in fallen or downed sorghum. The above described action on leaning crops is the same as above described for fallen or downed crops.

The snorkel probe and guide assemblies as 44 and 49 can be attached to any combine in minutes and can be readily adjusted to project more or less distance from the sickle bar units as 40 by attaching the bracket as 103 to the corresponding longitudinal support bar as 101 at holes, as 117, further along the length of bar 101 than hole 116 from end 111 thereof or less distant than hole 116 from end 111. The assemblies as 44 and 49 may be adjusted up or down by mounting the bar as 101 in a lower (as 129 and 129') or upper (as 127 and 127') set of holes in the bracket 103 (or 153).

For broadcast crops, it is recommended that the guides as 44 and 49 be spaced about a foot apart. Two guides per row is generally required for row crops.

A feature of the assembly 30 is that of a plurality of reel teeth or fingers as 81–83 pass between the rods as 104 and 104' of adjacent guide assemblies as 44 and 44' and feed such downed and/or leaning crops smoothly into the auger, thereby enabling the operator to clean fields thoroughly and getting back investment on a downed crop.

The guides 44 and 49 operate both above and even slightly below ground thereby taking the worry out of picking up fallen crops. The guides as 44 and 49 may be spaced easily according to the requirements of crop conditions: the structure of the guides as 44 and 49 keeps the front of the header 34 entirely open to allow tangled material to feed thereinto and avoids chopped off and fallen grain heads from the downed crops.

The curving tips 140 of each guide bar as 104 not only helps to get the front edge as 144 underneath the crop to be raised but also leaves sufficient room or clearance as space 126 below the lower edge as 113 below each longitudinal support member, as 101, to avoid that material or stalks be stepped upon or restricted by action of adjacent guides (a similar space 126' is provided under edge 163 or bar 161).

The probe and guide assemblies, as 44 and 49, can be used with or without the runners or shoes as 102.

While the array 43 is described above in use on a particular combine (Deere 7700), the array 43 may also be applied to the auger trough frame of another combine apparatus as in U.S. Pat. No. 2,656,668, also including a motor, wheels, frame, grain separator, auger and cutter bars combined as hereinabove described.

The header 34 forms the auger trough and is a rigid structure formed of rear wall 34R, a bottom wall 34B, and the rigid frame members, as 91–94. The embodiment 49 of snorkel probe and guide assembly which moves the probe portion thereof upwardly and rearwardly when the front end thereof meets a predetermined amount of resistance and automatically returns the probe to position shown in FIG. 10, to pass at ground level (± 1 inch) on removal of such resistance, may be used in place of the probe and guide assembly 44 in the overall assembly 30.

The overall assembly 30, as above described, with assemblies 44 or 49, provides a process of raising a mass of downed crop having stalks lying on the ground comprising the steps of passing an array, as 43, of rigid probes as 140 below the mass of downed stalks in a first horizontally extending line of travel, raising one portion of each of the stalks of said downed crop on the upwardly sloped vertically and horizontally extending vibrating guide rod, as 141, and moving along said line of travel 107 upwardly to portions, as 142, above the cutter bar, as 40, traveling at a height over the ground 70 above said downed stalks and cutting said stalks below the heads thereof by said cutter and depositing the cuttings into the header trough 34.

By sliding engagement of the downwardly facing wedge surface 177 and matching upper rear bar surface 168, the embodiment 49 provides for 3 inches of upward movement of the tip 144A thereof on a 6 inch rearward movement of the bar 156. The same action may be achieved by use of a roller in place of either surface 168 or 177 or a link mechanism may be used to provide the same relation of upward to rearward motion of the probe portion 144A. The portions of the rod 154 (144A, 145A, 146A, 147A, 148A) are denoted by referent numbers corresponding to the referent numbers (144, 145, 146, 147, 148) of corresponding parts of rod 104.

Measurements on an exemplary preferred embodiment are set out in Table I herebelow description of the apparatus and the process of this invention.

TABLE I — DIMENSIONS OF PREFERRED EMBODIMENT

Header 34

| | | |
|---|---|---|
| Width, left to right (may be 22 or 24 feet) | 95–96 | 20 ft. |

Combine Machine

| | |
|---|---|
| Name of Maker | John Deere |
| Type | 7700 |
| Literature Description John Deere 6600 and 7700 Combines | Operator's Manual OM-H78023 Issue K9 |
| Weight, empty | 7 tons |
| Tire size | 8 ply 23.1–26 |
| Motor horse power (power means 57) | 128 |
| Cutter bar speed (rpm) | 100–300 |
| Cutter bar horizontal travel | (approx.) 3 in. |
| Auger 36 rpm | (approx) 20 |
| Reel 45 rpm | 22–54 |
| shaft 55 to link 75 | 40–48 in. |
| length of tooth 81–88 | 8–12 in. |

Rod 104

| | |
|---|---|
| Total horizontal length with bar 101 Horizontal, front end 144 to rear end 143 | 32 |
| Length 144 to 146 (140) | 2 in. |
| Length 140 to 142 (141) | 27¼ in. |
| Length 141 to 143 (142) | 6¾ in. |
| Diameter of rod 104 | ⅝ in. |
| From top of edge 112 to bottom of 142 | 9 in. |
| Length along 104 from bottom of edge 113 to rear of 140 along 141 | 6 in. |
| Material: Cold rolled or hot rolled steel | |

Bar 101

| | |
|---|---|
| Length front of 111 to 114 | 46 in. |
| Height (edge 112 to 113) | 1½ in. |
| Width (across top edge 112) | ⅝ in. |
| Height of bottom of edge 113 over bottom of point 144 with bar 101 horizontal | 3 in. |
| Hole 116, 117 diameter | ½ in. |
| Distance, hole 116 to 117 | 3 in. |
| Distance, hole 116 to rear edge 114 | 21 in. |
| Material: Cold rolled or hot rolled steel | |
| Length of weld to 111 | 3 in. |

Angle

| | |
|---|---|
| Top of edge 112, bottom of 104 | 28° to 31° |

TABLE I — DIMENSIONS OF PREFERRED-Continued EMBODIMENT

Header 34

| | |
|---|---|
| Axis of portion 142 to horizontal (bar 101 being horizontal) | 10° |
| Axis of portion 140 with respect to bar 101 | 0° |

Bracket 103

| | |
|---|---|
| Top plate 131 | |
| Length (side-side) | 4 in. |
| Height (top-bottom) | ⅜ in. |
| Width (front to Rear) | 1 in. |
| Side plate 132 | |
| Height | 5¼ in. |
| Length (front to rear) | 1 in. |
| Width (side-side) | ⅜ in. |
| Holes 127, 128, 129 Diameter | ½ in. |
| Distance, center of hole to bottom of 131, 127 | 2 in. |
| 128 | 3 in. |
| 129 | 4 in. |
| Distance plate 132 to 133 | ⅝ in. |

Bolt 134

| | |
|---|---|
| Diameter of shaft | ½ in. |
| Total length | 2¾ in. |

RESILIENCY DATA

1. Rod 104. The rod 104 is sufficiently resilient that, with bar 101 horizontal and firmly held
   a. a constant force of 10 pounds downward at end 143 thereof causes a downward deflection of ¼ inch, while
   b. a constant vertical force on point 144 causes no measurable ( ± 1/32 inch) deflection, and
   c. a constant horizontal force of 10 pounds at end 143 transverse to the length of portion 142 causes a deflection of ¼ inch horizontally, and
   d. a constant vertical force at point 144 of 10 pounds causes no measurable ( ± 1/32 inch) deflection, and
   e. end 143 is readily made to oscillate vertically or horizontally by flicking it forcefully with a fingernail vertically or horizontally, respectively, and an audible sound is readily produced thereby.

2. Bar 101. While bar 101 is held firmly at the pin 134
   a. a horizontal constant force of 10 pounds at end 111 of bar 101 and transverse to the length of bar 101 causes a minimum (less than 1/32 inch) deflection, and
   b. a vertical force of 10 pounds at end 111 transverse to the length of bar 101 while bar 101 is held firmly at the pin 143 causes no measurable ( ± 1/64 inch) vertical deflection,
   c. while end 111 is not readily made to oscillate vertically or horizontally in an amount visible to the naked eye, on flicking it forcefully with a fingernail vertically or horizontally, respectively, an audible sound is readily produced thereby of higher pitch than at 143.

OPERATING DATA

The rear end of each guide bar in array 43, as rear end 143 of assembly 144, during operation of apparatus 30, oscillates up and down about ⅛ inch and oscillates from side to side about ⅛ inch about the central longitudinal axis of the rear guide bar portion, as 142. This vibration is additive to the shaking of the header 34 and its frame members as 91–96, caused by the effect of the oscillation of the cutter knives of the sickle bar unit 40 and the vibration of the grain separator unit and reel on the frame 32. The resulting left to right (from header left end wall 95 to right end wall 96) sideways shaking of the point as 144 of each guide assembly (as 144 of assembly 44) provides that each such point as 144 — urged by the weight and wheels of assembly 30 — moves readily through the earth at a depth of ½ to 1 inch below the level of ground on which the downed grain is located. The position of the cab 42 on the assembly 30 permits that the operator in such cab may raise the header 34 and the assembly 43 attached thereto where needed to avoid observable ground rises. Primarily, the assembly 43 is attempted to be driven and located at ground level, although ± ½ inch movement relative to the ground level results in satisfactory operation.

Overall weight of guide assembly 44 (with shoe) — 17 lb.
Overall weight of shoe 102 — 20 oz.
Material: steel, thickness — ⅛ in.
Rear support portion 123: Length × Width — 2 ½ × 4 in.
Distance, rear of shoe to point 144 — 16 ½ to 24 in.

I claim:
1. In operative combination
   a. a harvester frame and a grain separator, a power source, a cutter bar assembly, a reel unit, an auger and a header supported on said frame, said frame supported on ground engaging wheels, and a plurality of snorkel probe and guide assemblies operatively connected to said header; and
   b. said power source operatively connected to said wheel means and to said cutter bar unit and to said auger and to said separator, said cutter bars, auger and grain separator having movable parts whereby said power source vibrates said auger trough in horizontal and vertical directions; and
   c. each of said snorkel probe and guide assemblies comprising a longitudinal support member, a bracket support and an ogee curved guide member operatively connected,
   said longitudinal support member being a straight rigid bar having a front end edge, a top edge, a bottom edge and a rear end and a body, said bracket support comprising a rigid vertically extending rigid bracket plate, said bracket plate and bar being firmly and rigidly joined together, said guide member having a rigid front lower nose portion, a resilient intermediate upwardly and rearwardly sloped portion and a rear upper horizontally extending discharge portion and a rear end, said nose portion having a front probing point and a rearwardly and horizontally extending nose sub-portion immediately therebehind, said intermediate sloped portion has at its front a forward curved portion which is concave upwardly, continuous with and followed by a straight upwardly and rearwardly sloped straight central sloped portion which is continuous with and followed by a rear curved portion which is concave downwardly which is continuous with the front end of the discharge portion, said discharge portion extending horizontally to a point above said bracket support and terminating at a rear guide rod end,
   the front end edge of the longitudinal support member being firmly joined to a rear edge of the curved guide member, the bottom edge of the longitudinal support member being at a vertical level higher than the bottom of said nose portion of the curved guide member: the longitudinal support member and the curved guide member, along the entire length of both, extending in the same flat vertical plane,
   the bracket support being firmly attached to the header below and behind the cutter bar assembly, such attachment rigidly fixing the portion of the longitudinal support bar attached to the bracket support below the header, while the rear upper horizontally extending discharge portion of the guide member is located above the cutter bar unit and each rear guide rod end is located above and to the rear of the cutter knives but forward of the auger.

2. Combination as in claim 1 wherein the snorkel probe and guide assembly automatically yields rearwardly and tilts its nose upwardly, and wherein the longitudinal support assembly member comprises a straight rigid tiltable bar, a spring and a guide tensioning frame
   1. said tiltable bar having
      a. a front end
      b. a top edge, one front portion of which is straight from its front edge to the rear of the support bracket as far as the front edge of a positioning wedge and the upper rear portion of the top edge is sloped downwardly and rearwardly adjacent to said front edge of said wedge,
      c. a bottom edge to which are appended, at about its middle a longitudinally extending slot, and at its rear end, a spring hook retainer
   2. said guide tensioning frame comprises a rigid longitudinally and vertically extending left rigid panel, a rigid longitudinally and vertically extending right rigid panel, a wedge, and a spring, said panels being spaced apart from and parallel to each other and joined at their rear, and a wedge is located at top rear edge of said panels and has a smooth hard wedge surface that extends downwardly and rearwardly and matches the upper rear surface of said tiltable bar;
   3. a spring retainer pin is located below the bottom edge of said tiltable bar and extends between said plates and is firmly attached thereto and a spring extends from said spring retainer pin to said spring hook retainer, said panels forming a sliding fit with the rear portion of said tiltable bar, a bracket pin passing through holes in said bracket and through said longitudinally elongated slot to permit longitudinal movement of bar relative to that pin when the force of said spring is overcome, and as the bar moves rearwardly with respect to said bracket, the front end of the guide member is raised and moved backward.

3. Combination as in claim 1 wherein said curved guide member has a uniform transverse circular cross-section and said nose, intermediate, and discharge portions are formed of one integral piece of metal rod.

4. Apparatus as in claim 3 wherein said guide assemblies are equally spaced along a header and the reel has comb teeth reel support arms which are adjusted to locate the reel unit vertically and longitudinally with respect to the sickle bar unit so that the comb teeth thereof will pass between the snorkel probe and guide assemblies in front of the cutter bar at a level below the cutter bar height.

5. Apparatus as in claim 2 comprising also a spacer shoe attached to the bottom of the bar, said spacer shoe comprising a rigid metal plate of wearable steel which comprises, in operative combination, a front portion, an intermediate sloped portion and a rear support portion integrally serially joined together:

the front portion being a flat rigid plate firmly held adjacent to the bottom of the forward portion of bar between the front end of the bar and the support bracket hole, the intermediate sloped portion being sloped rearwardly and downwardly and fixedly attached to and continuous with the front edge of a wide and long smooth bottomed horizontal rear support plate whereby to provide a slidable vertical support for the point of the guide assembly.

6. A snorkel probe and guide assembly comprising a longitudinal support member, a bracket support and a curved guide member operatively connected said longitudinal support member being a straight rigid bar having a front end edge, a top edge, a bottom edge and a rear end and a body, said bracket support comprising a rigid vertically extending rigid bracket plate, said bracket plate and bar being firmly and rigidly joined together, said guide member having a rigid front lower nose portion, a resilient intermediate upwardly and rearwardly sloped portion and a rear upper horizontally extending discharge portion and a rear end, said nose portion having a front probing point and a rearwardly and horizontally extending nose sub-portion immediately therebehind, said intermediate sloped portion has at its front a forward curved portion which is concave upwardly, continuous with and followed by a straight upwardly and rearwardly sloped straight central sloped portion which is continuous with and followed by a rear curved portion which is concave downwardly which is continuous with the front end of the discharge portion, said discharge portion extending horizontally to a point above said bracket support and terminating at a rear guide rod end, the front end edge of the longitudinal support member being firmly joined to a rear edge of the curved guide member, the bottom edge of the longitudinal support member being at a vertical level higher than the bottom of said nose portion of the curved guide member: the longitudinal support member and the curved guide member, along the entire length of both, extending in the same flat vertical plane, the rear upper horizontally extending discharge portion of the guide member is located above the bracket support.

7. Combination as in claim 6 wherein the snorkel probe and guide assembly automatically yields rearwardly and tilts its nose upwardly, and wherein the longitudinal support assembly member comprises a straight rigid tiltable bar, a spring and a guide tensioning frame 1. said tiltable bar having
    a. a front end
    b. a top edge, one front portion of which is straight from its front edge to the rear of the support bracket as far as the front edge of a positioning wedge and the upper rear portion of the top edge is sloped downwardly and rearwardly adjacent to said front edge of said wedge,
    c. a bottom edge to which are appended, at about its middle a longitudinally extending slot, and at its rear end, a spring hook retainer
2. said guide tensioning frame comprises a rigid longitudinally and vertically extending left rigid panel, a rigid longitudinally and vertically extending right rigid panel, a wedge, and a spring, said panels being spaced apart from and parallel to each other and joined at their rear, and a wedge is located at top rear edge of said panels and has a smooth hard wedge surface that extends downwardly and rearwardly and matches the upper rear surface of said tiltable bar;
3. a spring retainer pin is located below the bottom edge of said tiltable bar and extends between said plates and is firmly attached thereto and a spring extends from said spring retainer pin to said spring hook retainer, said panels forming a sliding fit with the rear portion of said tiltable bar, a bracket pin passing through holes in said bracket and through said longitudinally elongated slot to permit longitudinal movement of bar relative to that pin when the force of said spring is overcome, and as the bar moves rearwardly with respect to said bracket, the front end of the guide member is raised and moved backward.

8. Combination as in claim 6 wherein said curved guide member has a uniform transverse circular cross-section and said nose, intermediate, and discharge portions are formed of one integral piece of metal rod.

9. Apparatus as in claim 8 comprising also a spacer shoe attached to the bottom of the bar, said spacer shoe comprising a rigid metal plate of wearable steel which comprises, in operative combination, a front portion, an intermediate sloped portion and a rear support portion integrally serially joined together: the front portion being a flat rigid plate firmly held adjacent to the bottom of the forward portion of bar between the front end of the bar and the support bracket hole, the intermediate sloped portion being sloped rearwardly and downwardly and fixedly attached to and continuous with the front edge of a wide and long smooth bottomed horizontal rear support plate whereby to provide a slidable vertical support for the point of the guide assembly.

* * * * *